US010152476B2

(12) United States Patent
Ishikawa

(10) Patent No.: US 10,152,476 B2
(45) Date of Patent: Dec. 11, 2018

(54) WEARABLE DEVICE AND TRANSLATION SYSTEM

(71) Applicant: Panasonic Intellectual Property Management Co., Ltd., Osaka (JP)

(72) Inventor: Tomokazu Ishikawa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 290 days.

(21) Appl. No.: 15/071,903

(22) Filed: Mar. 16, 2016

(65) Prior Publication Data

US 2016/0275076 A1  Sep. 22, 2016

(30) Foreign Application Priority Data

Mar. 19, 2015 (JP) ................................. 2015-056287
Feb. 1, 2016 (JP) ................................. 2016-016822

(51) Int. Cl.
| | | |
|---|---|---|
| G06F 17/28 | (2006.01) |
| H04R 29/00 | (2006.01) |
| G10L 13/00 | (2006.01) |
| G10L 15/26 | (2006.01) |
| H04R 1/40 | (2006.01) |
| H04R 3/00 | (2006.01) |
| H04R 3/12 | (2006.01) |
| H04S 7/00 | (2006.01) |

(52) U.S. Cl.
CPC ............ *G06F 17/289* (2013.01); *G10L 13/00* (2013.01); *G10L 15/26* (2013.01); *H04R 1/403* (2013.01); *H04R 1/406* (2013.01); *H04R 3/005* (2013.01); *H04R 3/12* (2013.01); *H04R 29/004* (2013.01); *H04S 7/303* (2013.01); *H04S 2400/15* (2013.01)

(58) Field of Classification Search
CPC .................................. G06F 17/20; G06F 17/28
USPC ............................................................ 704/3
See application file for complete search history.

(56) References Cited

U.S. PATENT DOCUMENTS 6,266,642 B1 * 7/2001 Franz .................... G06F 17/271
704/257
8,682,640 B2 * 3/2014 Jaiswal ................. G10L 15/005
704/2

(Continued)

FOREIGN PATENT DOCUMENTS

JP  2001-222531 A   8/2001
JP  2007-272260 A  10/2007

(Continued)

*Primary Examiner* — Daniel C Washburn
*Assistant Examiner* — Timothy Nguyen
(74) *Attorney, Agent, or Firm* — McDermott Will & Emery LLP

(57) ABSTRACT

In a wearable translation device, the control circuit obtains an audio signal of the second language, which has been converted from a first audio signal of the first language, and obtains a second audio signal of the first language reconverted from the audio signal of the second language. The first speaker device converts the audio signal of the second language into a first voice and outputs the first voice. The second speaker device converts the second audio signal of the first language into a second voice and outputs the second voice. The audio processing circuit executes such a process that the second voice from the second speaker device is directed toward an auditory part of a user, based on a position of the auditory part relative to the second speaker device.

10 Claims, 10 Drawing Sheets

(56) References Cited

U.S. PATENT DOCUMENTS

| | | | |
|---|---|---|---|
| 2004/0071294 A1* | 4/2004 | Halgas, Jr. | H04B 5/0006 381/59 |
| 2006/0143017 A1* | 6/2006 | Sonoura | G10L 15/26 704/275 |
| 2007/0202858 A1* | 8/2007 | Yu | H04M 1/605 455/414.1 |
| 2007/0273585 A1* | 11/2007 | Sarroukh | G10K 11/341 342/379 |
| 2008/0167868 A1* | 7/2008 | Kanevsky | G10L 15/20 704/233 |
| 2008/0260174 A1* | 10/2008 | Yokota | G10K 11/178 381/71.4 |
| 2008/0300852 A1* | 12/2008 | Johnson | G06F 17/289 704/2 |
| 2008/0312918 A1* | 12/2008 | Kim | G10L 15/01 704/233 |
| 2009/0070098 A1* | 3/2009 | Patryshev | G06F 3/0238 704/3 |
| 2009/0132233 A1* | 5/2009 | Etzioni | G06F 17/28 704/3 |
| 2009/0271190 A1* | 10/2009 | Niemisto | G10L 25/78 704/233 |
| 2009/0313005 A1 | 12/2009 | Jaquinta | |
| 2011/0033095 A1* | 2/2011 | Hale | G06F 17/2785 382/131 |
| 2011/0060583 A1* | 3/2011 | Choi | G06F 17/2836 704/2 |
| 2011/0080531 A1* | 4/2011 | Tanaka | H03G 5/00 348/738 |
| 2011/0125486 A1* | 5/2011 | Jaiswal | G06F 17/289 704/3 |
| 2011/0238407 A1* | 9/2011 | Kent | G06F 17/289 704/3 |
| 2013/0073276 A1* | 3/2013 | Sarikaya | G06F 17/289 704/2 |
| 2013/0170655 A1* | 7/2013 | Satoyoshi | G10K 11/175 381/56 |
| 2013/0211815 A1* | 8/2013 | Seligman | G06F 17/2755 704/2 |
| 2013/0289971 A1 | 10/2013 | Parkinson et al. | |
| 2014/0172411 A1 | 6/2014 | Kim et al. | |
| 2014/0321680 A1 | 10/2014 | Takahashi et al. | |
| 2015/0142416 A1* | 5/2015 | Lee | G06F 17/289 704/2 |
| 2015/0142813 A1* | 5/2015 | Burgmeier | G06F 17/30598 707/740 |
| 2015/0161097 A1* | 6/2015 | Swerdlow | G06F 17/275 704/9 |

FOREIGN PATENT DOCUMENTS

| | | |
|---|---|---|
| JP | 2012-093705 A | 5/2012 |
| WO | 2013/105413 A1 | 7/2013 |

\* cited by examiner

WEARABLE DEVICE AND TRANSLATION SYSTEM

RELATED APPLICATIONS

This application is based upon and claims the benefit of priority to Japanese Patent Application No. 2015-056287, filed on Mar. 19, 2015, and Japanese Patent Application No. 2016-016822, filed on Feb. 1, 2016, which are incorporated herein by reference in their entirety.

BACKGROUND

1. Technical Field

The present disclosure relates to a wearable device that is attached to a user's body to be used for automatically translating conversations between speakers of different languages in real time.

2. Description of the Related Art

According to development of techniques of speech recognition, machine translation, and voice synthesis, translation devices that automatically translate conversations between speakers of different languages in real time have been known. Such translation devices include portable or wearable devices.

For example, when utterance from a speaker of a first language to a speaker of a second language is translated by using a translation device, the speaker of the first language desires to check if contents of the translated utterance are correct or not. For this purpose, for example, PTL 1 and PTL 2 disclose a translation device that retranslates utterance, which has been translated from a first language into a second language, into the first language and feeds back the retranslated utterance to the speaker of the first language. The translation device disclosed in PTL 1 and PTL 2 uses a display or a voice to feed back the retranslated result to the speaker of the first language.

CITATION LIST

Patent Literatures

PTL 1: Unexamined Japanese Patent Publication No. 2001-222531
PTL 2: Unexamined Japanese Patent Publication No. 2007-272260
PTL 3: International Publication No. 2013/105413
PTL 4: Unexamined Japanese Patent Publication No. 2012-093705

The entire disclosures of these Patent Literatures are incorporated herein by reference.

In order to improve convenience of a translation device, for example, it is necessary to make speakers and listeners unaware of presence of the translation device as much as possible during use of the translation device so that the speakers and the listeners would feel they are making natural conversations even through when the translation device.

In a case of a portable or wearable translation device that uses its display for feeding back the retranslated results to a speaker of the first language, providing such a display would increase the entire size of the translation device. Therefore, some translation devices are not provided with displays and occasionally carry out the feedback only through a voice. However, when a speaker of the second language hears such a voice in the first language, which has been output as the result of the retranslation together with a translated voice of the second language, the conversation between the first speaker and the second speaker might be disturbed.

SUMMARY

The present disclosure provides a wearable device and a translation system that keep natural conversations when the conversations between speakers of different languages are translated and then the translated results are retranslated.

A wearable device according to one exemplary embodiment of the present disclosure is attachable to a specific position of a body of a user. The wearable device includes a microphone device that obtains a voice of a first language from the user and converts the voice into a first audio signal of the first language. Further, the wearable device includes a control circuit and an audio processing circuit. The control circuit obtains an audio signal of a second language converted from the first audio signal of the first language and obtains a second audio signal of the first language obtained by reconversion of the audio signal of the second language. The audio processing circuit executes a specific process on the second audio signal of the first language. Further, the wearable device includes a first speaker device and a second speaker device. The first speaker device converts the audio signal of the second language into a first voice and outputs the first voice. The second speaker device converts the processed second audio signal of the first language into a second voice and outputs the second voice. The audio processing circuit executes the specific process on the second audio signal of the first language so that the second voice to be output from the second speaker device is directed toward a user's auditory part, based on a position of the user's auditory part relative to the second speaker device.

The wearable translation device and the translation system of the present disclosure are effective in keeping natural conversations when conversations between speakers of different languages are translated and then the translated results are retranslated.

DETAILED DESCRIPTION

Exemplary embodiments are described in detail below suitably with reference to the drawings. Description that is in more detail than necessary is occasionally omitted. For example, detailed description about already well-known matters or overlapped description about the substantially same configurations is occasionally omitted. This is because the following description is avoided from being unnecessarily redundant, and a person skilled in the art is made to easily understand the present disclosure.

The accompanying drawings and the following description are provided for a person skilled in the art to fully understand the present disclosure, and do not intend to limit the subject matter described in claims.

First Exemplary Embodiment

A wearable translation device according to the first exemplary embodiment is described below with reference to FIG. 1 to FIG. 8.

1-1. Configuration

Figure 1:
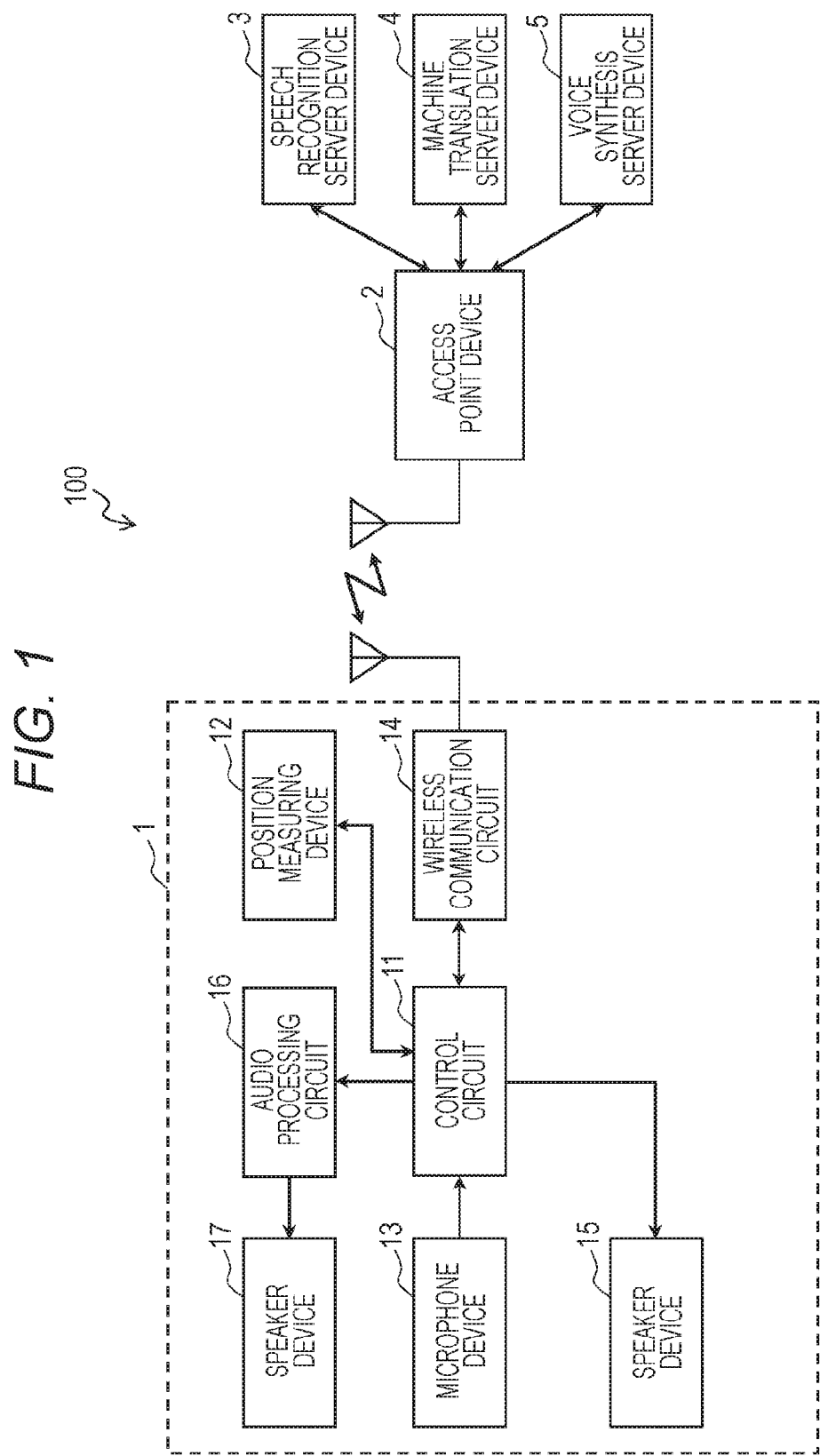
FIG. 1 is a block diagram illustrating a configuration of a translation system according to a first exemplary embodiment.

FIG. 1 is a block diagram illustrating a configuration of translation system 100 according to the first exemplary embodiment. Translation system 100 includes wearable translation device 1, access point device 2, speech recognition server device 3, machine translation server device 4, and voice synthesis server device 5.

Wearable translation device 1 can be attached to a predetermined position of a user's body. Wearable translation device 1 is attached to a thoracic region or an abdominal region of the user, for example. Wearable translation device 1 wirelessly communicates with access point device 2. Access point device 2 communicates with speech recognition server device 3, machine translation server device 4, and voice synthesis server device 5 via the Internet, for example. Therefore, wearable translation device 1 communicates with speech recognition server device 3, machine translation server device 4, and voice synthesis server device 5 via access point device 2. Speech recognition server device 3 converts an audio signal into a text. Machine translation server device 4 converts a text of a first language into a text of a second language, and converts the text of the second language into the text of the first language. Voice synthesis server device 5 converts a text into an audio signal.

Speech recognition server device 3, machine translation server device 4, and voice synthesis server device 5 are computer devices each of which has a control circuit such as a CPU or a memory. In speech recognition server device 3, the control circuit executes a process for converting an audio signal of a first language into a text of the first language according to a predetermined program. In machine translation server device 4, the control circuit executes a process for converting the text of the first language into a text of a second language according to a predetermined program. In voice synthesis server device 5, the control circuit converts the text of the second language into an audio signal of the second language according to a predetermined program. In this exemplary embodiment, speech recognition server device 3, machine translation server device 4, and voice synthesis server device 5 are formed by individual computer devices. They may be, however, formed by a single server device, or formed by a plurality of server devices so as to execute distributed functions.

In this exemplary embodiment, a case where a user of wearable translation device 1 is a speaker of a first language and the user converses with a speaker of a second language who is face-to-face with the user will be described. Further, this exemplary embodiment describes a case where the first language is Japanese and the second language is English. In the following description, the speaker of the second language does not utter a voice and participates in a conversation only as a listener. Further, retranslation means to translate a second language, which has been translated from a first language different from the second language, into the first language again.

Wearable translation device 1 includes control circuit 11, position measuring device 12, microphone device 13, wireless communication circuit 14, speaker device 15, audio processing circuit 16, and speaker device 17. Position measuring device 12 measures a position of an auditory part of user 31 (for example a right ear, a left ear, or both ears) relative to speaker device 17. Microphone device 13 obtains a voice of the first language from the user and converts the voice into an audio signal of the first language. Wireless communication circuit 14 communicates with speech recognition server device 3, machine translation server device 4, and voice synthesis server device 5, which are outside wearable translation device 1, via access point device 2. Control circuit 11 obtains an audio signal of a second language, which has been translated from an audio signal of a first language, from speech recognition server device 3, machine translation server device 4, and voice synthesis server device 5, via wireless communication circuit 14. Control circuit 11 then obtains an audio signal of the first language to be output as a result of retranslating the audio signal of the second language. Audio processing circuit 16 executes a predetermined process on the audio signal of the first language to be output as a result of the retranslation. Speaker device 15 converts the audio signal of the second language into a voice and outputs the voice. Speaker device 17 converts the processed audio signal of the first language into a voice and outputs the voice.

Wearable translation device 1 includes a plurality of speakers that converts the audio signal of the second language and/or the processed audio signal of the first language into a voice and outputs the voice. At least one of the plurality of speakers forms first speaker device 15, and at least two of the plurality of speakers form second speaker device 17.

Figure 2:
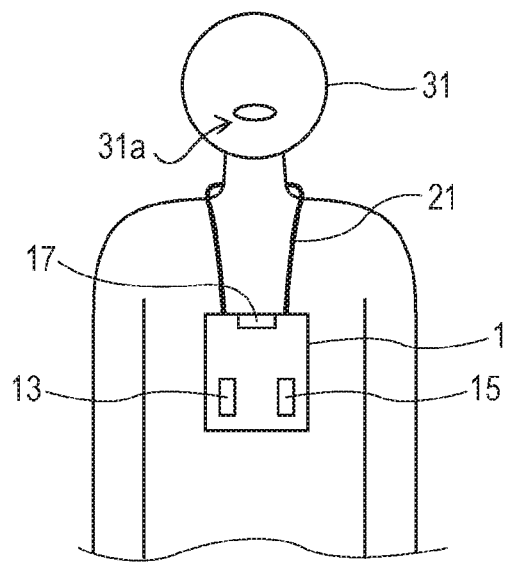
FIG. 2 is a diagram illustrating a first example of a state in which a user wears a wearable translation device of the translation system according to the first exemplary embodiment.
Figure 8:
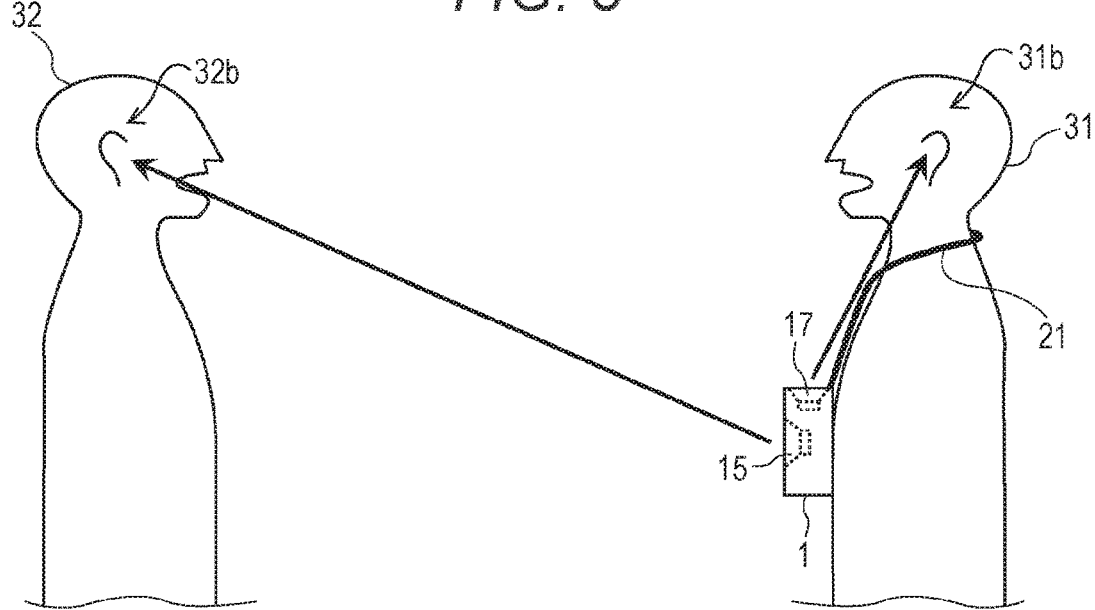
FIG. 8 is a diagram illustrating a direction of voices to be output from the speaker device when the wearable translation device of the translation system according to the first exemplary embodiment is used.

FIG. 2 is a diagram illustrating a first example of a state in which user 31 wears wearable translation device 1 of translation system 100 according to the first exemplary embodiment. User 31 wears wearable translation device 1 on his/her neck using strap 21, for example, such that wearable translation device 1 is located at a thoracic region or abdominal region of user 31. Microphone device 13 is a microphone array including at least two microphones arranged in a vertical direction with respect to the ground at intervals of a predetermined distance when user 31 wears wearable translation device 1 as shown in FIG. 2, for example. Microphone device 13 has a sound beam in a direction from microphone device 13 to vocal part 31a of the user (for example, a mouth). The vocal part means a portion including not only a user's mouth but also a region around the user's mouth such as a jaw and an area under a nose. Namely, the vocal part is a portion where information about a distance from speaker device 17 can be obtained. Speaker device 15 is provided so as to output a voice toward a listener who is face-to-face with user 31 when user 31 wears wearable translation device 1 as shown in FIG. 8. Speaker device 17 is provided so as to output a voice toward auditory part 31b of user 31 (for example the right ear, the left ear, or both the ears) when user 31 wears wearable translation device 1 as shown in FIG. 8. When user 31 wears wearable translation device 1 as shown in FIG. 2, for example, speaker device 15 is provided to a front surface of wearable translation device 1, and speaker device 17 is provided to an upper surface of wearable translation device 1.

Figure 3:
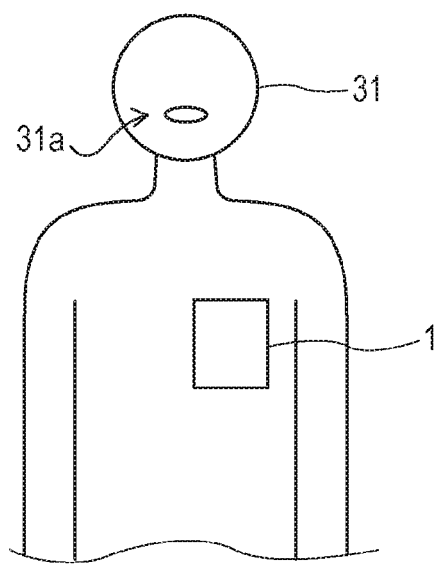
FIG. 3 is a diagram illustrating a second example of the state in which a user wears the wearable translation device of the translation system according to the first exemplary embodiment.

FIG. 3 is a diagram illustrating a second example of the state in which user 31 wears wearable translation device 1 of translation system 100 according to the first exemplary embodiment. Wearable translation device 1 may be attached to a thoracic region or an abdominal region of clothes, which user 31 wears, by a pin or the like. Wearable translation device 1 may be in the form of a name plate.

Figure 4:
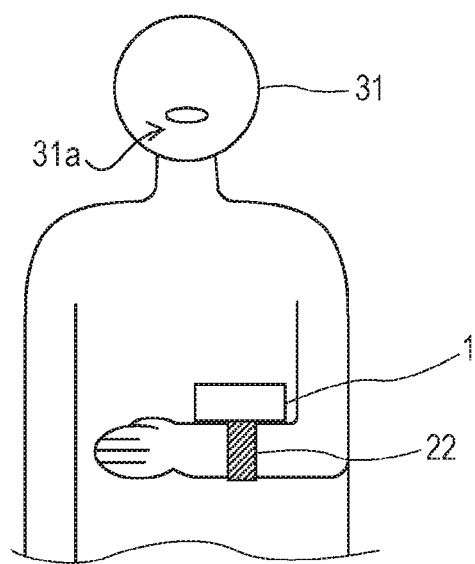
FIG. 4 is a diagram illustrating a third example of the state in which a user wears the wearable translation device of the translation system according to the first exemplary embodiment.

FIG. 4 is a diagram illustrating a third example of the state in which user 31 wears wearable translation device 1 of translation system 100 according to the first exemplary embodiment. Wearable translation device 1 may be attached to an arm of user 31 through belt 22, for example.

In wearable translation device 1 of FIG. 1, audio processing circuit 16 executes a process (direction process) on an audio signal of the first language to be output as the result of the retranslation so that the voice to be output from speaker device 17 is directed toward auditory part 31b of user 31, based on the position of auditory part 31b of user 31 relative to speaker device 17. This will be described below.

1-2. Operation

Figure 5:
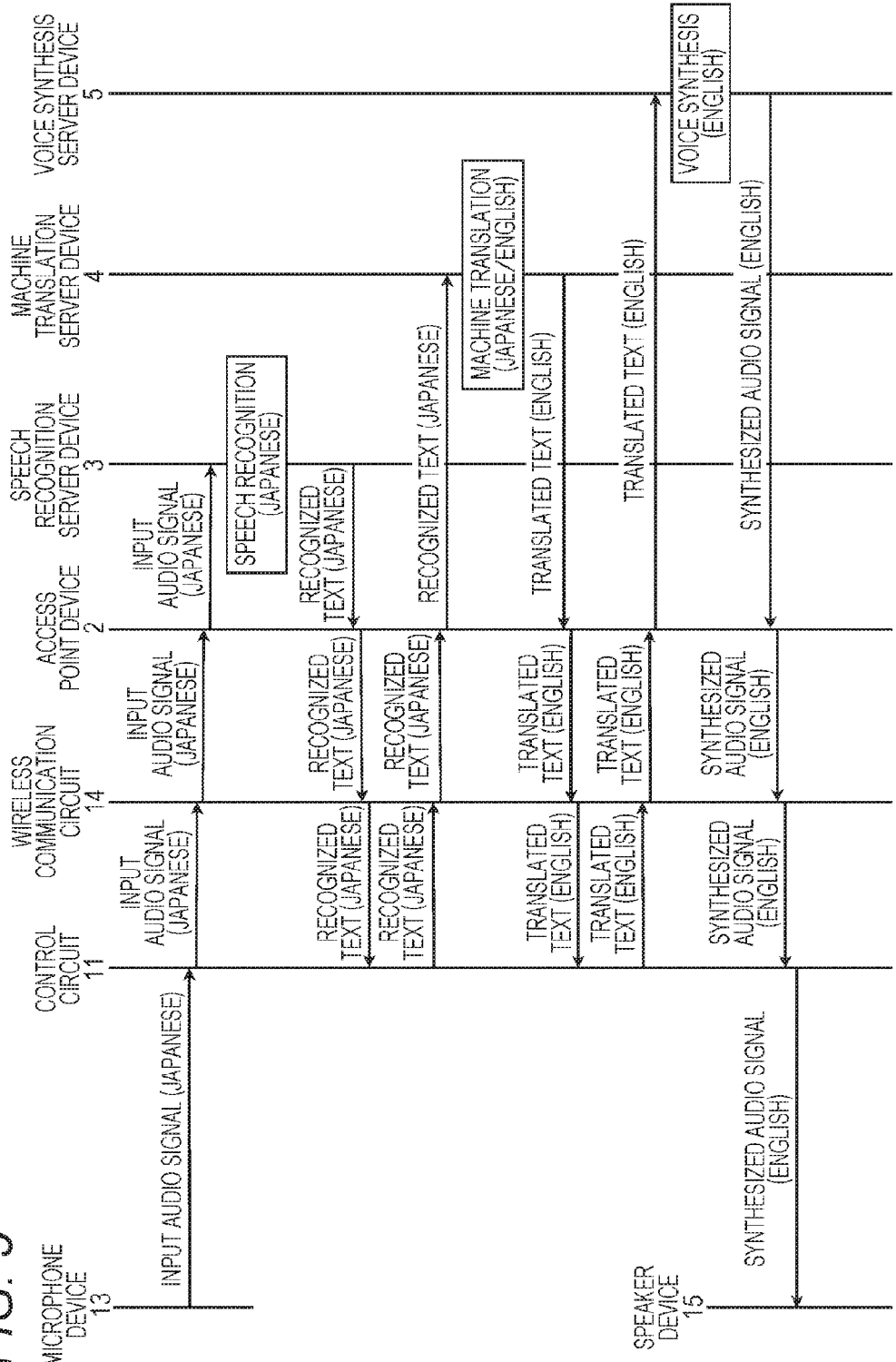
FIG. 5 is a sequence diagram illustrating a first portion of an operation of the translation system according to the first exemplary embodiment.

FIG. 5 is a sequence diagram illustrating a first portion of an operation of translation system 100 according to the first exemplary embodiment. When an audio signal of a Japanese language (a first language) is input from user 31 via microphone device 13, control circuit 11 transmits the input audio signal to speech recognition server device 3. Speech recognition server device 3 performs speech recognition on the input audio signal, generates a text of the recognized Japanese language, and transmits the text to control circuit 11. When control circuit 11 receives the Japanese text from speech recognition server device 3, control circuit 11 transmits the Japanese text as well as a control signal to machine translation server device 4. The control signal includes an instruction to translate the text from Japanese to English. Machine translation server device 4 performs machine translation on the Japanese text, generates a text of the English language (a second language) as a result of translation, and transmits the text to control circuit 11. When control circuit 11 receives the English text from machine translation server device 4, control circuit 11 transmits the English text to voice synthesis server device 5. Voice synthesis server device 5 performs voice synthesis on the English text, generates a synthesized audio signal of the English language, and transmits the audio signal to control circuit 11. When control circuit 11 receives the English audio signal from voice synthesis server device 5, speaker device 15 converts the English audio signal into a voice and outputs the voice.

Figure 6:
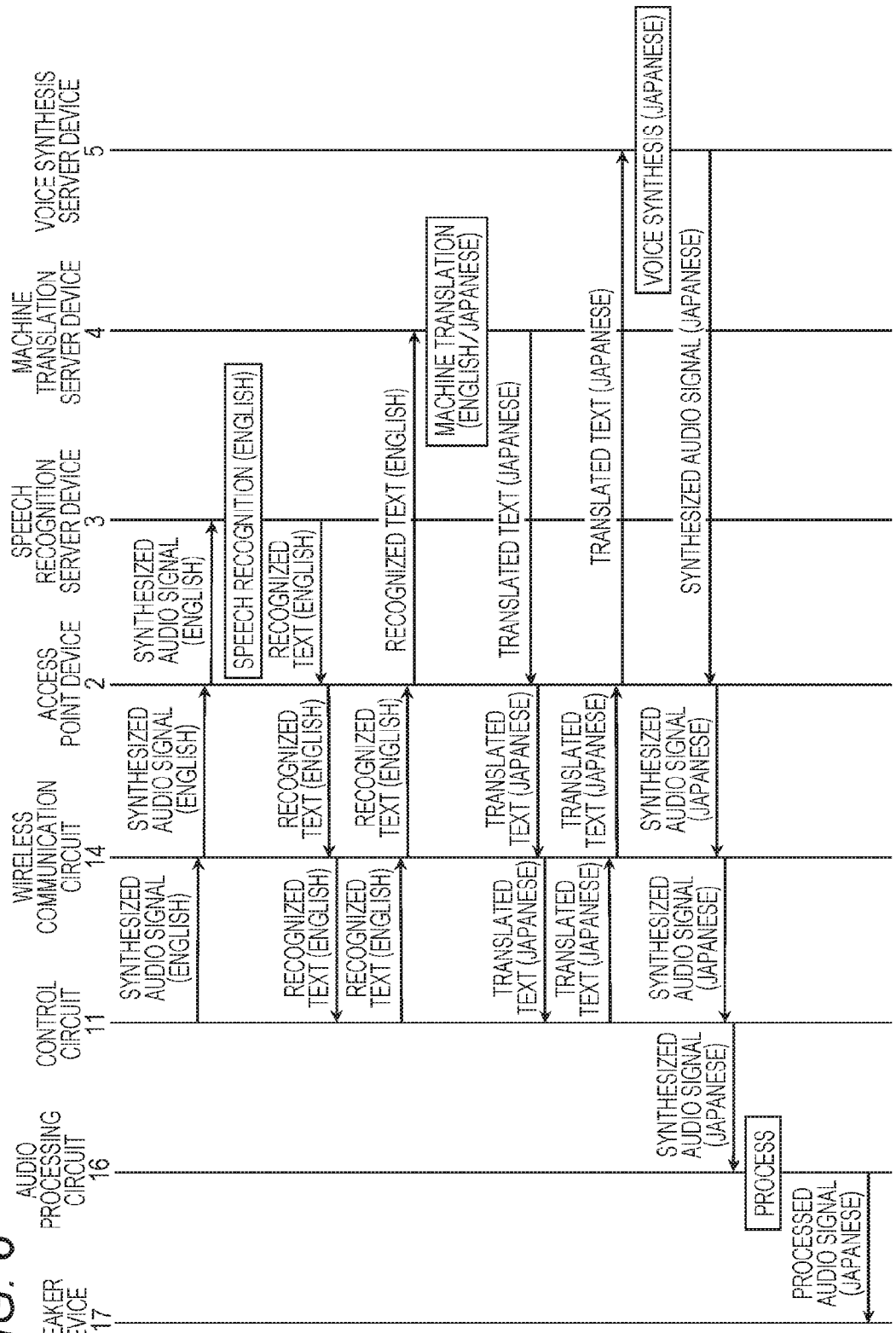
FIG. 6 is a sequence diagram illustrating a second portion of the operation of the translation system according to the first exemplary embodiment.

FIG. 6 is a sequence diagram illustrating a second portion of the operation of translation system 100 according to the first exemplary embodiment. FIG. 6 illustrates the operation performed after the operation in FIG. 5. When receiving the English (the second language) audio signal from voice synthesis server device 5, control circuit 11 transmits the English audio signal to speech recognition server device 3 in order for the English audio signal to be retranslated. Speech recognition server device 3 performs speech recognition on the English audio signal, generates a text of the recognized English language, and transmits the text to control circuit 11. When control circuit 11 receives the English text from speech recognition server device 3, control circuit 11 transmits the English text as well as a control signal to machine translation server device 4. The control signal includes an instruction to translate the text from English to Japanese. Machine translation server device 4 performs machine translation on the English text, generates a Japanese (the first language) text to be output as a result of the retranslation, and transmits the text to control circuit 11. When control circuit 11 receives the Japanese text from machine translation server device 4, control circuit 11 transmits the Japanese text to voice synthesis server device 5. Voice synthesis server device 5 performs voice synthesis on the Japanese text, generates a synthesized audio signal of the Japanese language, and transmits the audio signal to control circuit 11. When control circuit 11 receives the Japanese audio signal from voice synthesis server device 5, control circuit 11 transmits the Japanese audio signal to audio processing circuit 16. Audio processing circuit 16 processes the audio signal of the first language to be output as the result of the retranslation so that a voice to be output form speaker device 17 is directed toward auditory part 31b of user 31, based on the position of auditory part 31b of user 31 relative to speaker device 17. Audio processing circuit 16 converts the processed audio signal into a voice and outputs the voice through speaker device 17.

When the detection is not made that auditory part 31b is positioned within a predetermined distance from wearable translation device 1 or when the detection is not made that auditory part 31b is in a predetermined direction with respect to wearable translation device 1 (a direction toward which speaker device 17 faces: for example, an upper direction), audio processing circuit 16 may end the process without outputting a voice.

Figure 7:
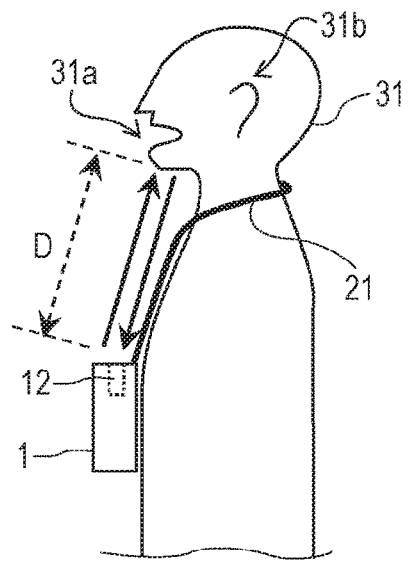
FIG. 7 is a diagram illustrating measurement of a position of a user's auditory part relative to a speaker device of the wearable translation device of the translation system according to the first exemplary embodiment.

FIG. 7 is a diagram illustrating measurement of the position of auditory part 31b of user 31 relative to speaker device 17 of wearable translation device 1 of the translation system 100 according to the first exemplary embodiment. Position measuring device 12 is provided on an upper surface of wearable translation device 1 when user 31 wears wearable translation device 1 as shown in FIG. 7, for example. Position measuring device 12 has a speaker and a microphone. In position measuring device 12, the speaker radiates an impulse signal toward a head of user 31, and the microphone receives the impulse signal reflected from a lower jaw of user 31. As a result, position measuring device 12 measures distance D between position measuring device 12 and the lower jaw of user 31. The position of speaker device 17 relative to position measuring device 12 is determined. Since variations in the position of a right ear and a left ear relative to lower jaws of individual users 31 do not make much difference, such a relative position can be preset.

Therefore, when user 31 wears wearable translation device 1 as shown in FIG. 7, the position of auditory part 31b of user 31 relative to speaker device 17 can be obtained if distance D is obtained.

In this example, the position of auditory part 31b of user 31 with respect to speaker device 17 is detected through measurement of the distance between speaker device 17 and the lower jaw of user 31, but another detecting method may be used. That is to say, the position of auditory part 31b of user 31 may be detected so that a voice from speaker device 17 is directed toward auditory part 31b of user 31.

Position measuring device 12 may measure the position of the auditory part of user 31 relative to speaker device 17 using the technique in PTL 3 or PTL 4, for example.

FIG. 8 is a diagram illustrating directions of voices to be output from the speaker devices 15 and 17 respectively when wearable translation device 1 of translation system 100 according to the first exemplary embodiment is used. User 31 is the speaker of the first language, and comes face-to-face with listener 32 who speaks the second language. Under the normal condition where user 31 and listener 32 have a conversation, user 31 faces listener 32 with a distance of about 1 m to 3 m between them while they are in a standing or seated posture. When user 31 wears wearable translation device 1 as shown in FIG. 2, for example, wearable translation device 1 is located below auditory part 31b of user 31 and is within a range between a portion right below a neck and a waist of user 31. Further, auditory parts (both ears) 31b, 32b of user 31 and listener 32 are in a horizontal plane which is parallel to the ground. In this case, a technique of stereo dipole reproduction, for example, can be used for outputting a voice from speaker device 17 to the auditory parts of user 31. Speaker device 17 includes two speakers disposed so as to be close to each other, and performs stereo dipole reproduction. Audio processing circuit 16 filters the audio signal of the first language to be output as the result of the retranslation so that the voice to be output from speaker device 17 is directed toward auditory part 31b of user 31, based on the position of auditory part 31b of user 31 relative to speaker device 17 and a head-related transfer function of user 31.

Audio processing circuit 16 may execute the following process instead of the stereo dipole reproduction. Speaker device 17 includes a plurality of speakers disposed at intervals of a predetermined distance. Audio processing circuit 16 splits an audio signal of the second language into plural audio signals corresponding to the plurality of speakers. Audio processing circuit 16 directs the voice to be output from speaker device 17 toward auditory part 31b of user 31. Audio processing circuit 16 may change a phase so that the split audio signals arrive at the right and left ears at the same time. As a result, the direction of the voice to be output from speaker device 17 can be changed.

Speaker device 15 includes plural speakers disposed at intervals of a predetermined distance, and may have a sound beam in a direction from speaker device 15 to a virtual person (for example, listener 32) who is face-to-face with user 31.

Wearable translation device 1 may have a gravity sensor that detects whether wearable translation device 1 practically keeps still. When wearable translation device 1 is moving, the position of the auditory part of user 31 relative to speaker device 17 cannot be accurately measured. Therefore, the measurement of the position of the auditory part of user 31 relative to speaker device 17 may be suspended. Alternatively, when wearable translation device 1 is moving, the position of the auditory part of user 31 relative to speaker device 17 may be roughly measured. In this case, audio processing circuit 16 may process the audio signal of the first language, which is to be output as the result of the retranslation, based on the roughly measured relative position so that the voice to be output from speaker device 17 is directed toward the auditory part of user 31.

More specifically, first, position measuring device 12 may roughly measure the position of the auditory part of user 31 relative to speaker device 17 (for example, when user 31 puts on wearable translation device 1). Next, audio processing circuit 16 may process the audio signal of the first language, which is to be output as the result of the retranslation, based on the roughly measured relative position so that the voice to be output from speaker device 17 is directed toward auditory part 31b of user 31. Then, position measuring device 12 may measure the position of auditory part 31b of user 31 relative to speaker device 17 more accurately. Finally, audio processing circuit 16 may process the audio signal of the first language, which is to be output as the result of the retranslation, based on the more accurate position of auditory part 31b of user 31 relative to speaker device 17 so that the voice to be output from speaker device 17 is directed toward the auditory part of user 31.

1-3. Effects

A wearable device corresponding to wearable translation device 1 according to the first exemplary embodiment is attachable to a specific position of a body of user 31. The wearable device includes microphone device 13 that obtains a voice of the first language from user 31 and converts the voice into an audio signal of the first language. Further, the wearable device includes control circuit 11 and audio processing circuit 16. Control circuit 11 obtains an audio signal of the second language converted from the audio signal of the first language and obtains the audio signal of the first language reconverted from the audio signal of the second language. Audio processing circuit 16 executes a specific process on the reconverted audio signal of the first language. Further, wearable translation device 1 includes a first speaker device corresponding to speaker device 15 and a second speaker device corresponding to speaker device 17. The first speaker device converts an audio signal of the second language into a first voice and outputs the first voice. The second speaker device converts the audio signal of the first language which has undergone the specific process into a second voice and outputs the second voice. Audio processing circuit 16 processes the reconverted audio signal of the first language so that the second voice to be output from the second speaker device is directed toward auditory part 31b of user 31, based on a position of the auditory part of user 31 relative to the second speaker device. The wearable device corresponding to wearable translation device 1 can be configured so that natural conversations are hardly deteriorated even when a conversation between speakers of different languages is converted, the converted result is reconverted and the reconverted result is fed back only as a voice without a display on which the reconverted result is displayed. As a result, the translation can be carried out giving users such feelings as "simpleness" and "lightness", which are characteristics of a wearable translation device. Further, since the reconverted voice is reproduced precisely at user's ear, user 31 easily recognizes the reconverted voice and can check if contents of the converted conversation are correct only through a voice without using a display.

Wearable translation device 1 according to the first exemplary embodiment may be attached to a thoracic region or an abdominal region of user 31. As a result, the translation can be carried out giving users such feelings as "simpleness" and "lightness", which are characteristics of a wearable translation device.

In the wearable device corresponding to wearable translation device 1 according to the first exemplary embodiment, the second speaker device corresponding to speaker device 17 includes two speakers disposed to be close to each other, and may perform stereo dipole reproduction. Further, audio processing circuit 16 may process the reconverted audio signal of the first language, based on a position of auditory part 31b of user 31 relative to the second speaker device corresponding to speaker device 17 and a head-related transfer function of user 31. As a result, the reconverted voice can be reproduced precisely at user's ears by use of an existent technique of the stereo dipole reproduction.

In the wearable device corresponding to wearable translation device 1 according to the first exemplary embodiment, the second speaker device corresponding to speaker device 17 may include plural speakers disposed at intervals of a predetermined distance. Further, audio processing circuit 16 splits the reconverted audio signal of the first language into plural audio signals corresponding to the plural speakers. Audio processing circuit 16 then may adjust phases of the plural split audio signals. As a result, the reconverted voice can be reproduced precisely at the user's ears by use of an existent technique of beam forming.

In the wearable device corresponding to wearable translation device 1 according to the first exemplary embodiment, microphone device 13 may include a plurality of microphones disposed at intervals of a predetermined distance. Further, microphone device 13 has a sound beam in a direction from microphone device 13 to vocal part 31a of user 31. As a result, the wearable device is less susceptible to noises other than a voice of user 31 (for example, a voice of listener 32 in FIG. 8).

In the wearable device corresponding to wearable translation device 1 according to the first exemplary embodiment, the first speaker device corresponding to speaker device 15 may include a plurality of speakers disposed at intervals of a predetermined distance. Further, the first speaker device corresponding to speaker device 15 may have a sound beam in a direction from the first speaker device to a virtual person who is face-to-face with user 31. As a result, user 31 is less susceptible to the converted voice of the second language, and easily recognizes the reconverted voice of the first language.

The wearable device corresponding to wearable translation device 1 according to the first exemplary embodiment may further include position measuring device 12. Position measuring device 12 measures the position of auditory part 31b of user 31 relative to the second speaker device corresponding to speaker device 17. As a result, the reconverted voice can be reproduced precisely at the user's ears based on the actual position of the auditory part of user 31 relative to speaker device 17.

Translation system 100 according to the first exemplary embodiment includes the wearable device corresponding to wearable translation device 1 further including a communication circuit corresponding to wireless communication circuit 14. Translation system 100 may include speech recognition server device 3, machine translation server device 4, and voice synthesis server device 5 that are outside the wearable device. Speech recognition server device 3 may convert an audio signal of the first language into a text of the first language, and may convert an audio signal of the second language into a text of the second language. Machine translation server device 4 may convert the text of the first language into the text of the second language, and may reconvert the text of the second language into the text of the first language. Voice synthesis server device 5 may convert the text of the second language into the audio signal of the second language, and may convert the text of the first language into the audio signal of the first language. Control circuit 11 may obtain the audio signal of the second language and the reconverted audio signal of the first language from voice synthesis server device 5 via a communication circuit corresponding to wireless communication circuit 14. As a result, the configuration of wearable translation device 1 can be simplified. For example, speech recognition server device 3, machine translation server device 4, and voice synthesis server device 5 may be provided by a third party (cloud service) different from a manufacturer or a seller of wearable translation device 1. Use of the cloud service can provide, for example, a multi-lingual wearable translation device at low cost.

Second Exemplary Embodiment

A wearable translation device according to the second exemplary embodiment is described below with reference to FIG. 9.

Components that are similar to the components of translation system 100 and wearable translation device 1 in the first exemplary embodiment are denoted by the same symbols and description thereof is occasionally omitted.

2-1. Configuration

Figure 9:
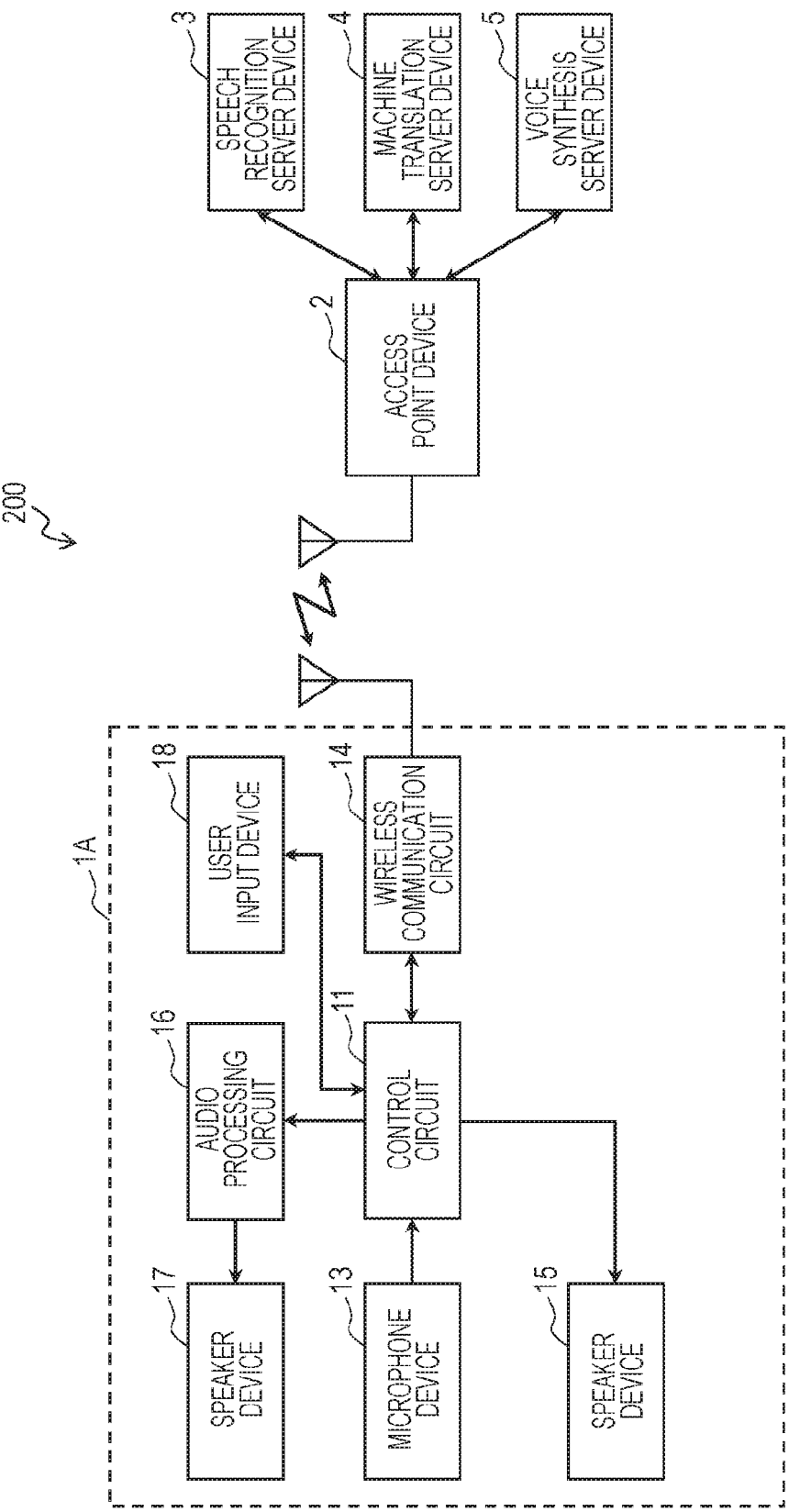
FIG. 9 is a block diagram illustrating a configuration of the translation system according to a second exemplary embodiment.

FIG. 9 is a block diagram illustrating a configuration of translation system 200 according to the second exemplary embodiment. Wearable translation device 1A of translation system 200 according to the second exemplary embodiment includes user input device 18 instead of position measuring device 12 in FIG. 1. Otherwise, wearable translation device 1A of FIG. 9 is configured similarly to wearable translation device 1 in FIG. 1.

2-2. Operation

User input device 18 obtains a user input that specifies a position of auditory part 31b of user 31 relative to speaker device 17 (FIG. 7). User input device 18 is formed by a touch panel or buttons.

A plurality of predetermined distances (for example, far (60 cm), middle (40 cm), and close (20 cm)) corresponding to distance D in FIG. 7 is selectively set in wearable translation device 1A. The user can select any one of these distances using user input device 18. Control circuit 11 obtains the position of auditory part 31b of user 31 relative to speaker device 17 based on the distance input from user input device 18.

2-3. Effect

A wearable device corresponding to wearable translation device 1A according to the second exemplary embodiment may further include user input device 18 that obtains a user input specifying the position of auditory part 31b of user 31 relative to the second speaker device corresponding to speaker device 17. Since position measuring device 12 in FIG. 1 is removed, the configuration of wearable translation device 1A in FIG. 9 is made to be simpler than the configuration of wearable translation device 1 in FIG. 1.

Third Exemplary Embodiment

A wearable translation device according to the third exemplary embodiment is described below with reference to FIG. 10 and FIG. 11.

Components that are similar to the components of translation system 100 and wearable translation device 1 in the first exemplary embodiment are denoted by the same symbols and description thereof is occasionally omitted.

3-1. Configuration

Figure 10:
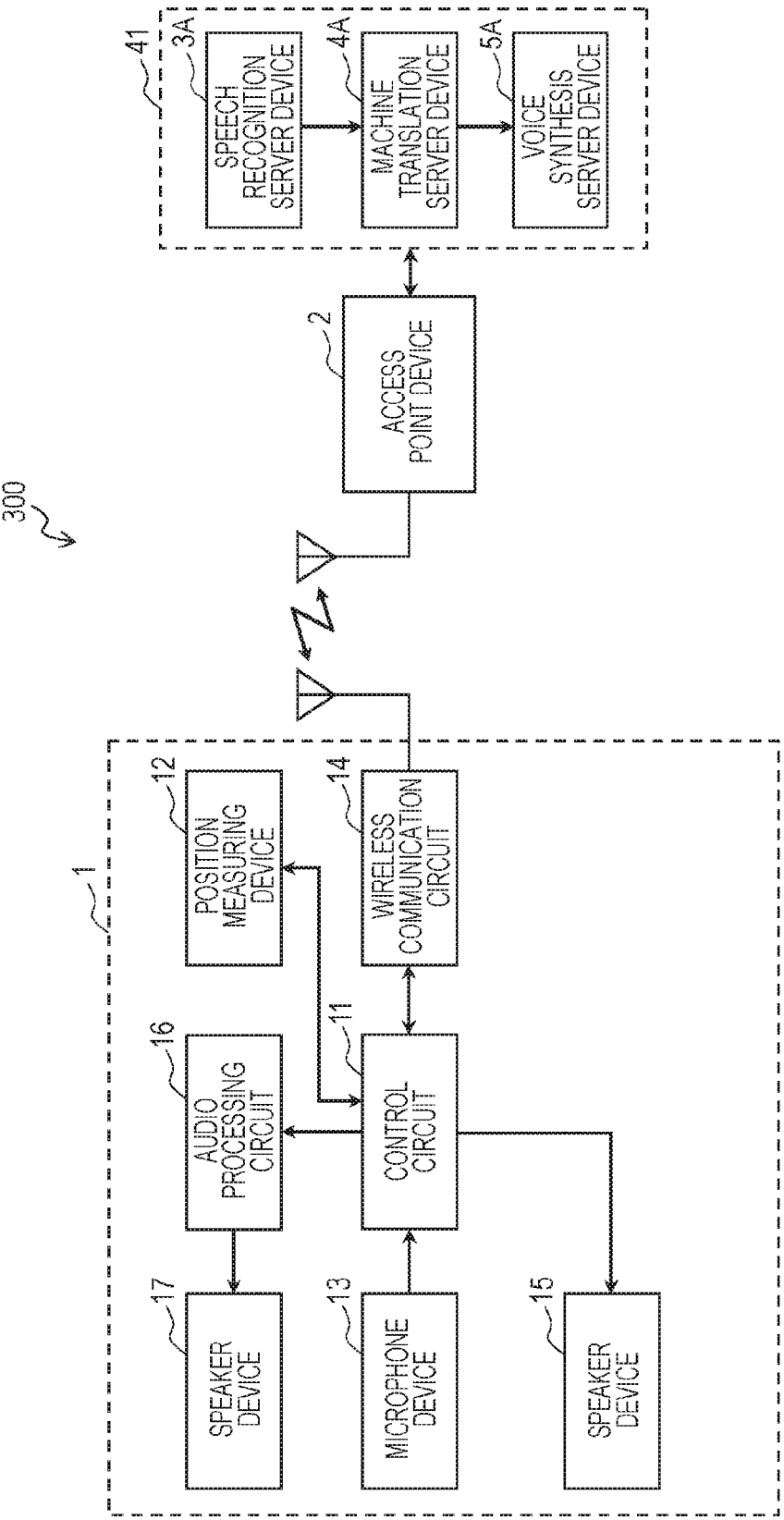
FIG. 10 is a block diagram illustrating a configuration of the translation system according to a third exemplary embodiment.

FIG. 10 is a block diagram illustrating a configuration of translation system 300 according to the third exemplary embodiment. Translation system 300 includes wearable translation device 1, access point device 2, and translation server device 41. Translation server device 41 includes speech recognition server device 3A, machine translation server device 4A, and voice synthesis server device 5A. Wearable translation device 1 and access point device 2 in FIG. 10 are configured similarly to wearable translation device 1 and access point device 2 in FIG. 1. Speech recognition server device 3A, machine translation server device 4A, and voice synthesis server device 5A in FIG. 10 have the functions that are similar to the functions of speech recognition server device 3, machine translation server device 4, and voice synthesis server device 5 in FIG. 1, respectively. Access point device 2 communicates with translation server device 41 via, for example, the Internet. Therefore, wearable translation device 1 communicates with translation server device 41 via access point device 2.

3-2. Operation

Figure 11:
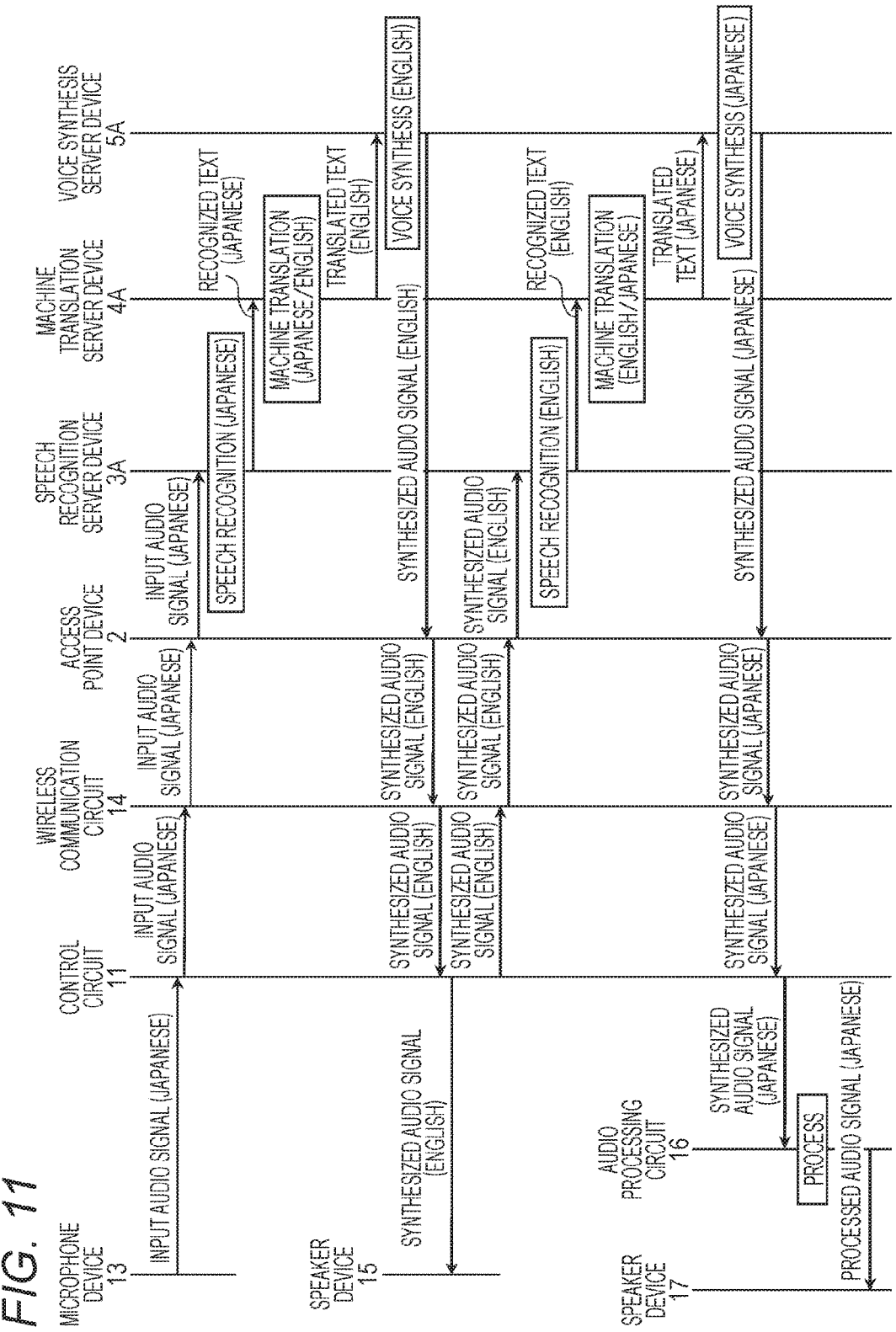
FIG. 11 is a sequence diagram illustrating an operation of the translation system according to the third exemplary embodiment.

FIG. 11 is a sequence diagram illustrating an operation of translation system 300 according to the third exemplary embodiment. When an audio signal of a Japanese language (a first language) is input from user 31 via microphone device 13, control circuit 11 transmits the input audio signal to translation server device 41. Speech recognition server device 3A of translation server device 41 performs speech recognition on the input audio signal, generates a text of the recognized Japanese language, and transmits the text to machine translation server device 4A. Machine translation server device 4A performs machine translation on the Japanese text, generates a text of the English language (a second language) as a result of the translation, and transmits the text to voice synthesis server device 5A. Voice synthesis server device 5A performs voice synthesis on the English text, generates a synthesized audio signal of the English language, and transmits the audio signal to control circuit 11. When control circuit 11 receives the English audio signal from voice synthesis server device 5A, speaker device 15 converts the English audio signal into a voice and outputs the voice.

When receiving the audio signal of the English language (the second language) from voice synthesis server device 5A, control circuit 11 transmits the English audio signal to translation server device 41 for retranslation. Speech recognition server device 3A of translation server device 41 performs speech recognition on the English audio signal, generates a text of the recognized English language, and transmits the text to machine translation server device 4A. Machine translation server device 4A performs machine translation on the English text, generates a text of the Japanese language (the first language) as a result of the retranslation, and transmits the text to voice synthesis server device 5A. Voice synthesis server device 5A performs voice synthesis on the Japanese text, generates a synthesized audio signal of the Japanese language, and transmits the audio signal to wearable translation device 1. When control circuit 11 receives the Japanese audio signal from voice synthesis server device 5A, control circuit 11 transmits the Japanese audio signal to audio processing circuit 16. Audio processing circuit 16 processes the audio signal of the first language, which is to be output as a result of retranslation, based on the position of auditory part 31b of user 31 relative to speaker device 17 so that a voice to be output from speaker device 17 is directed toward the auditory part 31b of user 31. Audio processing circuit 16 makes speaker device 17 convert the processed audio signal into a voice and output the converted voice.

3-3. Effect

Translation system 300 according to the third exemplary embodiment may include speech recognition server device 3A, machine translation server device 4A, and voice synthesis server device 5A as integrated translation server device 41. As a result, a number of communication times can be made to be smaller than the number of communication times of translation system 100 including wearable translation device 1 according to the first exemplary embodiment, so that a time and power consumption necessary for the communication can be reduced.

Fourth Exemplary Embodiment

A wearable translation device according to the fourth exemplary embodiment is described below with reference to FIG. 12.

Components that are similar to the components of translation system 100 and wearable translation device 1 in the first exemplary embodiment are denoted by the same symbols and description thereof is occasionally omitted.

4-1. Configuration

Figure 12:
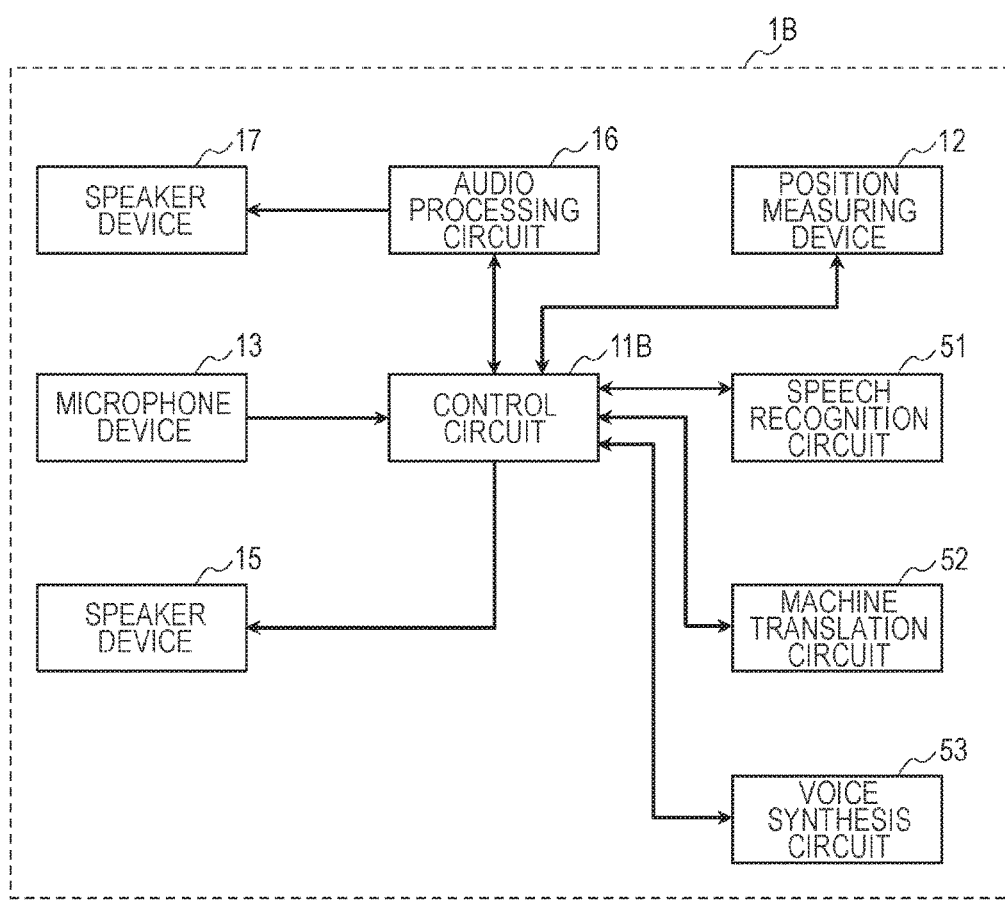
FIG. 12 is a block diagram illustrating a configuration of the wearable translation device of the translation system according to a fourth exemplary embodiment.

FIG. 12 is a block diagram illustrating a configuration of wearable translation device 1B according to the fourth exemplary embodiment. Wearable translation device 1B in FIG. 12 has functions of speech recognition server device 3, machine translation server device 4, and voice synthesis server device 5 in FIG. 1. Wearable translation device 1B includes control circuit 11B, position measuring device 12, microphone device 13, speaker device 15, audio processing circuit 16, speaker device 17, speech recognition circuit 51, machine translation circuit 52, and voice synthesis circuit 53. Position measuring device 12, microphone device 13, speaker device 15, audio processing circuit 16, and speaker device 17 in FIG. 12 are configured similarly to the corresponding components in FIG. 1. Speech recognition circuit 51, machine translation circuit 52, and voice synthesis circuit 53 have functions that are similar to the functions of speech recognition server device 3, machine translation server device 4, and voice synthesis server device 5 in FIG. 1. Control circuit 11B obtains an audio signal of the second language and an audio signal of the first language. The audio signal of the second language, which is translated from the audio signal of the first language, is retranslated into an audio signal of the first language by use of speech recognition circuit 51, machine translation circuit 52, and voice synthesis circuit 53.

4-2. Operation

When the audio signal of the Japanese language (a first language) is input from user 31 via microphone device 13, control circuit 11B transmits the input audio signal to speech recognition circuit 51. Speech recognition circuit 51 performs speech recognition on the input audio signal, generates a text of the recognized Japanese language, and transmits the text to control circuit 11B. When control circuit 11B receives the Japanese text from speech recognition circuit 51, control circuit 11B transmits the Japanese text as well as a control signal to machine translation circuit 52. The control signal includes an instruction to translate the text from Japanese to English. Machine translation circuit 52 performs machine translation on the Japanese text, generates a text of the English language (a second language) as a result of the translation, and transmits the text to control circuit 11B. When control circuit 11B receives the English text from machine translation circuit 52, control circuit 11B transmits the English text to voice synthesis circuit 53. Voice synthesis circuit 53 performs voice synthesis on the English text, generates a synthesized signal of the English language, and transmits the audio signal to control circuit 11B. When control circuit 11B receives the English audio signal from voice synthesis circuit 53, speaker device 15 converts the English audio signal into a voice and outputs the voice.

When the audio signal of the English language (the second language) is transmitted from voice synthesis circuit 53, control circuit 11B transmits the English audio signal to speech recognition circuit 51 for retranslation. Speech recognition circuit 51 executes speech recognition on the English audio signal, generates a text of the recognized English language, and transmits the text to control circuit 11B. When control circuit 11B receives the English text from speech recognition circuit 51, control circuit 11B transmits the English text as well as a control signal to machine translation circuit 52. The control signal includes an instruction to retranslate the text from English to Japanese. Machine translation circuit 52 performs machine translation on the English text, generates a text of the Japanese language (the first language) as a result of the retranslation, and transmits the text to control circuit 11B. When control circuit 11B receives the Japanese text from machine translation circuit 52, control circuit 11B transmits the Japanese text to voice synthesis circuit 53. Voice synthesis circuit 53 performs voice synthesis on the Japanese text, generates a synthesized Japanese audio signal, and transmits the audio signal to control circuit 11B. When control circuit 11B receives the Japanese audio signal from voice synthesis circuit 53, control circuit 11B transmits the Japanese audio signal to audio processing circuit 16. Audio processing circuit 16 processes the audio signal of the first language, which is to be output as the result of the retranslation, based on the position of auditory part 31b of user 31 relative to speaker device 17 so that a voice to be output form speaker device 17 is directed toward auditory part 31b of user 31. Audio processing circuit 16 makes speaker device 17 convert the processed audio signal into a voice and output the converted voice.

Speech recognition circuit 51 performs speech recognition and generates a text of the recognized first language. Thereafter, speech recognition circuit 51 may transmit the text not to control circuit 11B but to machine translation circuit 52. Similarly, machine translation circuit 52 performs machine translation and generates a translated or retranslated text. Thereafter, machine translation circuit 52 may transmit the text not to control circuit 11B but to voice synthesis circuit 53.

4-3. Effect

The wearable device corresponding to wearable translation device 1B according to the fourth exemplary embodiment may further include speech recognition circuit 51, machine translation circuit 52, and voice synthesis circuit 53. Speech recognition circuit 51 converts an audio signal of the first language into a text of the first language. Machine translation circuit 52 converts the text of the first language into a text of the second language. Voice synthesis circuit 53 converts the text of the second language into an audio signal of the second language. Further, control circuit 11B may obtain the audio signal of the second language from voice synthesis circuit 53. Speech recognition circuit 51 may convert the audio signal of the second language into the text of the second language. Machine translation circuit 52 may reconvert the text of the second language into the text of the first language. Voice synthesis circuit 53 may convert the reconverted text of the first language into the audio signal of the first language. Control circuit 11B may obtain the audio signal of the first language from voice synthesis circuit 53. As a result, wearable translation device 1B can translate conversations between speakers of different languages without communicating with an external server device.

Other Exemplary Embodiments

The first to fourth exemplary embodiments are described above as examples of the technique disclosed in the present application. However, the technique in the present disclosure is not limited to the first to the fourth exemplary embodiments and can be applied also to exemplary embodiments where modifications, substitutions, additions and omissions are suitably performed. Further, the respective components described in the first to fourth exemplary embodiments are combined so that another exemplary embodiment can be constructed.

Therefore, other exemplary embodiments are illustrated below.

The first to third exemplary embodiments describe wireless communication circuit 14 as one example of the communication circuit of the wearable translation device. However, any communication circuit may be used as long as it can communicate with a speech recognition server device, a machine translation server device, and a voice synthesis server device, which are provided on the outside of the circuit. Therefore, the wearable translation device may be connected with the speech recognition server device, the machine translation server device, and the voice synthesis server device on the outside of the wearable translation device via a wire.

The first to fourth exemplary embodiments illustrate the control circuit, the communication circuit, and the audio processing circuit of the wearable translation device as individual blocks, but these circuits may be configured as a single integrated circuit chip. Further, the functions of the control circuit, the communication circuit, and the audio processing circuit of the wearable translation device may be constructed by a general-purpose processor that executes programs.

The first to fourth exemplary embodiments describe the case where only one user (speaker) uses the wearable translation device, but the wearable translation device may be used by a plurality of speakers of different languages who tries to have conversations with each other.

In the first to fourth exemplary embodiments, an audio signal of a first language to be output as a result of retranslation is processed so that a voice to be output from speaker device 17 is directed toward auditory part 31b of user 31. However, the audio signal of the first language to be output as the result of the retranslation may be processed so that the voice to be output from speaker device 17 is directed toward some other part than the auditory part of user 31.

The first to fourth exemplary embodiments describe the case where the first language is Japanese and the second language is English, but the first language and the second language may be any other languages.

According to the first and second exemplary embodiments, speech recognition server device 3 performs speech recognition on both the first language and the second language, machine translation server device 4 performs both translation from the first language to the second language and from the second language to the first language, and voice synthesis server device 5 performs voice synthesis on both the first language and the second language. Alternatively, individual speech recognition server devices may be used in order to perform speech recognition on the first language and speech recognition on the second language, respectively. Individual machine translation server devices may be used in order to perform the translation from the first language to the second language and the translation from the second language to the first language, respectively. Individual voice synthesis server devices may be used in order to perform the voice synthesis on the first language and the voice synthesis on the second language, respectively. Much the same is true for translation server device 41 in the third exemplary embodiment, and speech recognition circuit 51, machine translation circuit 52, and voice synthesis circuit 53 in the fourth exemplary embodiment.

In the first to fourth exemplary embodiments, after speaker device 15 converts the audio signal of the second language as translated into a voice and outputs the voice, the audio signal of the second language is retranslated. Alternatively, control circuit 11 may delay conversion of the audio signal of the second language into a voice and output of the voice from speaker device 15 until control circuit 11 obtains the audio signal of the first language to be output as the result of the retranslation. Control circuit 11 may make speaker device 15 convert the audio signal of the second language into a voice and output the voice, and practically at the same time, may make speaker device 17 convert the processed audio signal of the first language as a result of retranslation into a voice and output the voice. Further, the wearable translation device may include the user input device. In this case, if control circuit 11 outputs the voice of the first language as the result of the retranslation an obtains a user's input indicating that contents of the output voice are appropriate through the user input device, control circuit 11 may then output the voice of the translated second language. By contrast, when obtaining the user input indicating inappropriateness of the contents of the voice of the first language output as the result of the retranslation through the user input device, control circuit 11 may then obtain another candidate for the text of the translated second language from machine translation server device 4 and output an audio signal of the first language obtained as a result of the retranslation of the text of the second language.

The exemplary embodiments are described above as the examples of the technique in the present disclosure. For this reason, the accompanying drawings and the detailed description are provided.

Therefore, the components described in the accompanying drawings and the detailed description include not only components essential for solving the problem but also components that are not essential for solving the problem in order to illustrate the technique. For this reason, even when the unessential components are described in the accompanying drawings or the detailed description, they do not have to be recognized as being essential.

Further, since the above exemplary embodiments illustrate the technique in the present disclosure, various modifications, substitutions, additions and omissions can be performed within the scope of claims or equivalent scope of claims.

The present disclosure can provide the wearable translation device that hardly deteriorates natural conversation when the wearable translation device translates conversations between speakers of different languages and retranslates the translated result.

What is claimed is:

1. A wearable device attachable to a specific position of a body of a user, the device comprising:
    a microphone device that obtains a voice of a first language from the user and converts the voice into a first audio signal of the first language;
    a control circuit that obtains an audio signal of a second language converted from the first audio signal of the first language and obtains a second audio signal of the first language obtained by reconversion of the audio signal of the second language;
    an audio processing circuit that executes a specific process on the second audio signal of the first language;
    a first speaker device that converts the audio signal of the second language into a first voice and outputs the first voice; and
    a second speaker device that converts the second audio signal of the first language into a second voice and outputs the second voice, wherein;
    a direction of a sound beam of the first speaker device is different from a direction of a sound beam of the second speaker device, and
    the audio processing circuit executes the specific process on the second audio signal of the first language so that the second voice to be output from the second speaker device is directed toward an auditory part of the user to which the wearable device is attached, based on a position of the auditory part of the user relative to the second speaker device; and
    wherein the second speaker device includes a plurality of speakers disposed at intervals of a predetermined distance, and
    the audio processing circuit splits the second audio signal of the first language into plural audio signals corresponding to the plurality of speakers, and adjusts phases of the plural split audio signals, thereby executing the specific process on the second audio signal of the first language.

2. The wearable device according to claim 1, wherein the second speaker device includes two speakers disposed close to each other and executes stereo dipole reproduction, and
    the audio processing circuit processes the specific process on the second audio signal of the first language based on the position of the auditory part of the user relative to the second speaker device and a head-related transfer function of the user.

3. The wearable device according to claim 1, wherein the microphone device includes a plurality of microphones disposed at intervals of a predetermined distance and has a sound beam in a direction from the microphone device to the auditory part of the user.

4. The wearable device according to claim 1, wherein the first speaker device includes a plurality of speakers disposed at intervals of a predetermined distance and has the sound beam in a direction from the first speaker device to a virtual person who is face-to-face with the user.

5. The wearable device according to claim 1, further comprising a position measuring device that measures the position of the auditory part of the user relative to the second speaker device.

6. The wearable device according to claim 5, wherein:
    the position measuring device includes a speaker and a microphone,
    the speaker radiates an impulse signal toward a head of the user, the microphone receives the impulse signal reflected from the head of the user, and the position measuring device measures the position of the auditory part of the user relative to the second speaker device based on the received impulse signal.

7. The wearable device according to claim 1, further comprising a user input device that obtains a user input specifying the position of the auditory part of the user relative to the second speaker device.

8. The wearable device according to claim 1, further comprising:
- a speech recognition circuit that converts the first audio signal of the first language into a first text of the first language;
- a machine translation circuit that converts the first text of the first language into a text of the second language; and
- a voice synthesis circuit that converts the text of the second language into the audio signal of the second language, wherein the control circuit obtains the audio signal of the second language from the voice synthesis circuit, the speech recognition circuit converts the audio signal of the second language into the text of the second language, the machine translation circuit reconverts the text of the second language into a second text of the first language, the voice synthesis circuit converts the second text of the first language into the second audio signal of the first language, and the control circuit obtains the second audio signal of the first language from the voice synthesis circuit.

9. A translation system comprising:
the wearable device of claim 1 further including a communication circuit;
a speech recognition server device connectable with the wearable device;
a machine translation server device connectable with the wearable device; and
a voice synthesis server device connectable with the wearable device, wherein the speech recognition server device converts the first audio signal of the first language into a first text of the first language and converts the audio signal of the second language into a text of the second language, the machine translation server device converts the first text of the first language into the text of the second language and reconverts the text of the second language into a second text of the first language, the voice synthesis server device converts the text of the second language into the audio signal of the second language and converts the second text of the first language into the second audio signal of the first language, and the control circuit obtains the audio signal of the second language and the second audio signal of the first language from the voice synthesis server device via the communication circuit.

10. The translation system according to claim 9, wherein the speech recognition server device, the machine translation server device, and the voice synthesis server device are provided as an integrated translation server device.

* * * * *